July 30, 1957 YOSHIO IKEUCHI ET AL 2,801,410
DEVICE FOR LOCATING SUBMERGED OBJECTS
Filed June 1, 1956 2 Sheets-Sheet 1
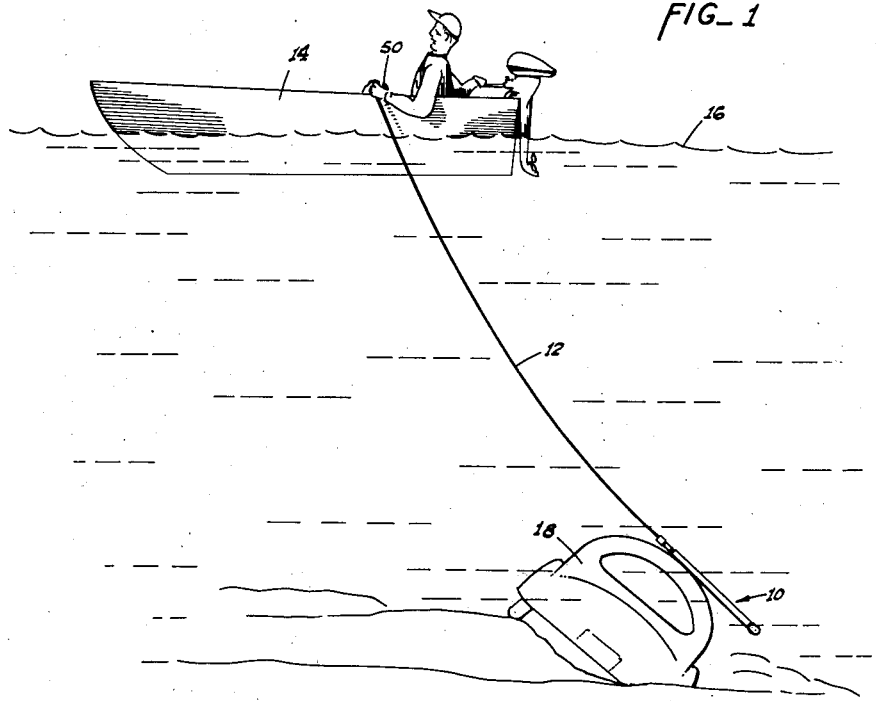
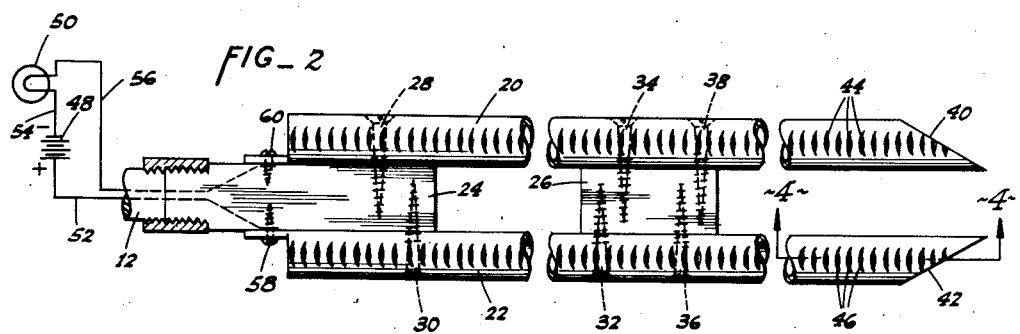
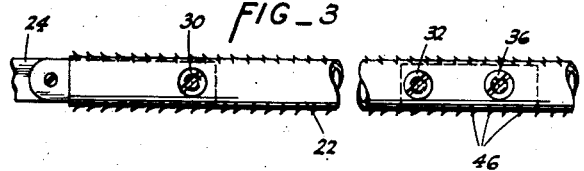 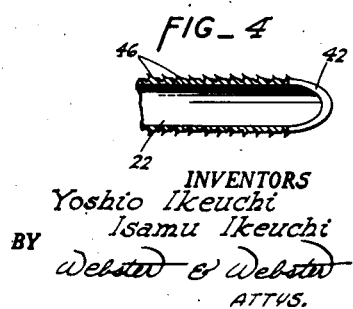
INVENTORS
Yoshio Ikeuchi
Isamu Ikeuchi
BY Webster & Webster
ATTYS.

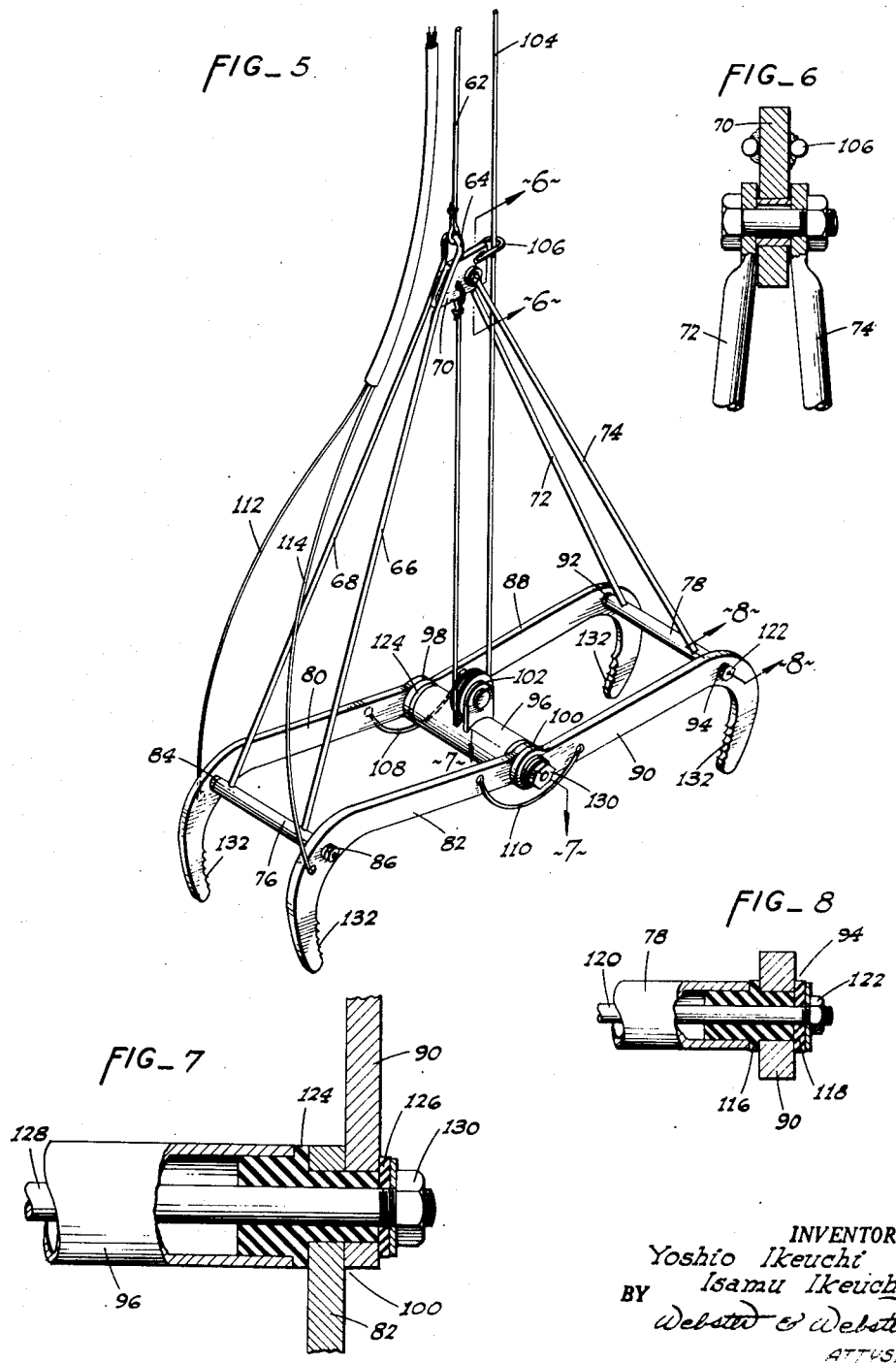

United States Patent Office 2,801,410
Patented July 30, 1957

2,801,410

DEVICE FOR LOCATING SUBMERGED OBJECTS

Yoshio Ikeuchi and Isamu Ikeuchi, Walnut Grove, Calif.

Application June 1, 1956, Serial No. 588,694

10 Claims. (Cl. 340—282)

This invention pertains to a means for detecting the position of objects submerged in a liquid, and more particularly to a means for detecting the position of electrically conductive objects submerged in a relatively non-conductive liquid.

One of the more important uses of the device of this invention is to detect the presence of large conductive bodies such as—for example—automobiles which have been lost in a stream or lake. When an automobile plunges off of a bridge or over a bank into a stream or lake it is customary to drag the lake bottom to detect the object. Hooks are customarily used to find objects on the bottom of a lake or stream. Hooks catch in grass and upon boulders and other debris, as well as upon the desired object.

The device of this invention is adapted to be dragged along the bottom of a lake or a stream and to give an indication when a highly conductive piece of material is contacted. In its most rudimentary form the device of this invention comprises a pair of conducting members which are adapted to be pulled or towed along the bottom of a lake or stream until they come into contact with the desired object. The conducting members are insulated from each other and connected by a line or cable to a boat upon the surface of a lake or stream. Wire conductors are connected from the conducting members of the device of this invention to a voltage source and indicating means on the boat, such as—for example—a light connected in series between the conducting members of the device of this invention.

It is therefore an object of this invention to detect conductive objects submerged in a relatively non-conductive liquid.

It is another object of this invention to detect the position of conductive objects submerged in water.

It is still another object of this invention to detect the position of metallic conductive bodies submerged in water.

It is a more particular object of this invention to detect the position of metallic objects such as automobiles and the like submerged in a lake, stream, river, or other body of water.

It is also an object of the invention to provide a practical, reliable, and durable device for locating submerged objects, and one which will be exceedingly effective for the purpose for which it is designed.

These objects are accomplished by means of such structure and relative arrangement of parts as will fully appear by a perusal of the following specification and claims.

In the drawings:

Fig. 1 is a sketch showing a typical device of this invention utilized to find submerged automobiles in a body of water.

Fig. 2 is an enlarged plan view of a first embodiment of this invention showing a voltage source and indicating means connected in series between the conducting members thereof.

Fig. 3 is a fragmentary side view, foreshortened, of the device shown in Fig. 2.

Fig. 4 is a view, partially in section, taken on line 4—4 of Fig. 2.

Fig. 5 is a perspective view of a claw grapnel constructed in accordance with this invention.

Fig. 6 is a view, partially in section, taken on line 6—6 of Fig. 5.

Fig. 7 is a view, partially in section, taken on line 7—7 of Fig. 5.

Fig. 8 is a view, partially in section, taken on line 8—8 of Fig. 5.

Referring now more particularly to the drawings and to the characters of reference marked thereon, the device of this invention, as shown in Fig. 1 and indicated generally at 10, is attached by means of tow line 12 to boat 14 upon the surface of water 16. Conductive wires, as described more particularly hereinafter, accompany tow line 12. Fig. 1 is designed to show a typical use of the device of this invention in detecting submerged objects, such as automobile 18.

A first embodiment of this invention is shown in detail in Figs. 2, 3, and 4. Elongated conducting members 20 and 22, here metallic rods, are disposed in transversely spaced relation and mechanically connected by means of an insulating frame shown at 24 and 26. An example of an insulating frame that would be suitable in Figs. 2, 3, and 4 is in the form of simple wood blocks 24 and 26 between and connected to members 20 and 22 by means of screws 28, 30, 32, 34, 36, and 38; the block 24 being at one end of members 20 and 22, and the tow line 12 being suitably connected to said block 24.

Screws 28, 34, and 38 must not come into electrical contact with screws 30, 32, and 36. More particularly, the device of Fig. 2 is adapted to drag along the bottom of the lake or stream with its two conducting members 20 and 22 in a plane substantially normal to its direction of travel. When the device shown in Fig. 2 starts to tip, its own mechanical stability causes it to place both conducting members facing the bottom of the lake or stream bed. The bottom ends of conductive members 20 and 22 are tapered, as shown at 40 and 42 respectively, to skid along the water bed without snagging.

It has been found advantageous to cut file teeth into conductive members 20 and 22 along the faces which may come in contact with the desired submerged object. When conductive members 20 and 22 come into contact with a submerged object, file teeth 44 and 46 scrape the object and remove accumulated film or paint to cause members 20 and 22 to make electrical contact with the body.

Voltage source 48 and indicating means 50, both in the boat, are connected in series by means of wires 52, 54, and 56 with conducting members 20 and 22. Conducting members 20 and 22 are connected to wires 52 and 56 at screws 58 and 60. The indicating means 50 may be a light, a meter, or other resistance or current measuring device.

A closable claw unit or grapnel constructed in accordance with this invention, and being a second embodiment thereof, is shown in Figs. 5, 6, 7, and 8. The claw unit shown in Fig. 5 is adapted to be submerged in a liquid, such as in a stream or lake. The entire structure is supported by means of cable 62. Cable 62 is connected by means of eyelet 64 to downwardly divergent struts 66 and 68, and to plate 70; other or opposed downwardly divergent struts 72 and 74 being attached to said plate. Struts 66 and 68 support separator bar 76, while struts 72 and 74 support separator bar 78.

The bar 76 is end-supported relative to claws 80 and 82 at bearing 84 and 86; bar 78 is end-supported relative to claws 88 and 90 at bearings 92 and 94; and the separator bar 96 is end-supported relative to the related connected inner ends of claws 80, 82, 88, and 90 at bearings 98 and 100.

Separator bar 96 carries a pulley 102 and a cable 104, which is anchored at plate 70, depends to and passes around pulley 102, runs upwardly through eyelet 106, and thence to the surface of the liquid, stream, or lake. Opposable hooks or claws 80 and 88 are connected electrically by means of conducting wire 108, while the other pair of opposable hooks or claws 82 and 90 are similarly electrically connected by means of conducting wire 110.

Electrical conducting wires 112 and 114 carry to the surface of the liquid and at their upper ends are connected in series with a voltage source and indicating device 50, as shown in Fig. 2, and at their lower ends said wires are connected respectively to claws 80 and 82.

Each pair of opposable claws are insulated from the other pair as described hereinafter. At bearings 98 and 100, the latter being shown in Fig. 7, such opposable claws are insulated from separator bar 96 by means of insulated bushings 124 and 126. Claws 80 and 88 at the inner end, and claws 82 and 90 at the corresponding end, are held together with separator bar 96 by means of rod 128 and nuts, one of which is shown at 130.

Further, at bearings 84, 86, 92, and 94, the latter being shown in Fig 8, the claws are insulated from separator bars 76 and 78 by means of insulating bushings 116 and 118. Each of the separator bars 76 and 78, and the related claws, are held together by means of a rod 120 and nuts, one of which is shown at 122.

File teeth 132 are formed on the inside or working surfaces of claws 80, 82, 88, and 90 to scratch non-conducting films off of conducting bodies.

When device 10, of the embodiment shown in Fig. 2, is dragged through the water and comes into contact with an object such as automobile 18, file teeth 44 and 46 scrape paint, rust, and other films off of object 18. Electrical contact is thus made with object 18 to short circuit conductive elements 20 and 22. The current then flows from the voltage source 48, through electrical detecting device 50, thence through elements 20 and 22 and through object 18, causing such device 50 to indicate that a conductive object has been contacted and is positioned at the end of tow line 12.

The grapnel or claw unit, of the embodiment shown in Fig. 5, is—in use—dropped to first locate and then pick up conducting object 18. When claws 80, 82, 88, and 90 are in the proper position about the submerged object and the grapnel is closed, the file teeth 132 scrape non-conductive film off of the object. The current then flows from voltage source 48 through electrical detecting device 50, claws 80 or 88, object 18, and thence through claws 82 or 90, and back to voltage source 48, causing such device 50 to indicate that the conducting object 18 is engaged by the grapnel.

When the liquid—in which the object is sought—is water, a voltage source which has a very low voltage connected in series with a lamp, such as a flash light lamp, is suitable to detect metallic objects. The higher the conductivity of the liquid, the more sensitive the measuring instrument must be in order to detect conducting bodies. For example, the problem is slightly more difficult in salt water than it is in fresh water. If indicating lamps are found to be impractical because it is difficult to determine the brightness of the lamp due to the conductance of the liquid and the conductance of the submerged body, it may be desirable to utilize a meter. Another alternative would be—for example—to use a voltage balancing device such as a "Wheatstone" bridge as a detecting device.

Although the device of this invention was originally intended to be used to find submerged automobiles in a lake or stream, it is obvious that other conducting objects, and particularly metallic conducting objects, may be located in pools of any liquid which has a conductivity which is materially below that of the submerged object which is being detected. For example, metallic conductors can be located in chemical solutions such as—for example—oil baths and plating solutions.

There has thus been provided by the device of this invention a novel and economical means for locating the position of conductive bodies submerged in a relatively non-conductive liquid. There has also been provided by this invention a means for finding conductive objects submerged in a body of water.

Although two particular embodiments of the device of this invention have been shown in the drawings, and described in the above specification, it is not intended that the invention should be limited by the described embodiments, but only in accordance with the spirit and scope of the appended claims.

Having thus described the invention, the following is claimed as new and useful, and upon which Letters Patent are desired:

1. An electric detecting device adapted to be submerged in a liquid to detect the position of conducting objects submerged in said liquid comprising a pair of conducting elements positioned in insulated relation with respect to each other, said elements having metal file means positioned thereon, and a voltage source and electrical indicating means connected in series between said elements; the voltage of said voltage source and the characteristics of said indicating means being such as to give a distinctive indication when a metallic connection is made between said conducting members, whereby when said conducting members strike a metallic object the file surfaces thereon scrape the surface of said object to cause it to create a short circuit between said members.

2. Means for detecting a metallic object submerged in a liquid comprising a pair of metallic conducting members having file surfaces thereon and insulated from each other, and voltage means and electrical indicating means connected in series between said members whereby when said members come in contact with a metallic conducting object said file surfaces scratch the surface of said object to cause said object to create a short circuit between said members to thereby create an indication upon said indicating means.

3. An electrical sensing element adapted to be submerged in a liquid to detect conducting objects located within said liquid comprising a pair of conducting members electrically insulated from each other adapted to be pulled through said liquid and along the bottom thereof, voltage means and electrical indicating means disposed above the surface of the liquid, electrical conductions connecting said voltage means and indicating means in series between said members, and a file surface upon said members adapted to remove non-conducting films from submerged objects whereby when a submerged object is contacted by said submerged members said file surface scrapes non-conducting films from said object and, if said object is a conductor, a short circuit is generated between said members to thereby create an indication upon said indicating means.

4. A device, as recited in claim 3, in which said conducting members comprise a pair of rods rigidly attached together by insulating means and having files upon their exterior surfaces adapted to create a filing action when said rods are pulled through said liquid.

5. A submergible grapnel adapted to detect conducting objects submerged in a liquid comprising two pairs of opposable claws, the claws of each pair being adapted to be opened and closed to grasp an object, mechanical means adapted to simultaneously control the opening and closing of the claws of said pairs, each pair of opposable claws being insulated from the other, the claws of each pair of opposable claws being conductively connected, and voltage means and electrical indicating means connected in series between one pair of opposable claws and the other pair of opposable claws whereby when said claws are utilized to grapple for a submerged conducting object a definite indication is received upon said indicating means when said claws contact said conducting object.

6. A device, as in claim 5, including file means upon the interior surfaces of said claws adapted to scrape covering films from submerged conducting objects.

7. Two pair of conducting opposable claws mechanically connected together by electrically non-conductive material and adapted to open and close together, means for controlling the opening and closing motion of said claws, electrical conductors connected between said claws of each pair to place them at the same electrical potential, file teeth on the inside surfaces of said claws, and a voltage source and electrical detecting means connected in series between one pair of claws and the other pair of claws.

8. An electrical detecting device, for locating a conducting object submerged in water, comprising a pair of spaced conducting members, means connecting the members in insulated relation and as a submergible unit, a tow line attached to the unit, wires corresponding and connected to the members, said wires being adapted to extend lengthwise relative to the tow line, and a voltage source and an electrical indicating device connected in series between said wires at a point remote from the unit.

9. A device, as in claim 8, in which the members are elongated metallic rods secured in spaced but side by side relation, the tow line being attached to one end of the unit, and file teeth formed on opposite faces of said rods.

10. An electrical device, for detecting and lifting a conducting object submerged in water, comprising a grapnel adapted to close from an open position, means to suspend the grapnel in the water, means to close the grapnel when so suspended, said grapnel including cooperating claws, certain of said claws being insulated from others, a pair of wires connected at one end to claws which are insulated from each other, the wires being adapted to extend with their other ends above the water, and a voltage source and an electrical indicating device connected in series between the wires at said other end thereof.

References Cited in the file of this patent

UNITED STATES PATENTS

| | | |
|---|---|---|
| 358,655 | Frik | Mar. 1, 1887 |
| 2,154,654 | Armentrout et al. | Apr. 18, 1939 |
| 2,507,986 | Liss | May 16, 1950 |
| 2,762,995 | Gilbert | Sept. 11, 1956 |